United States Patent [19]

Freeman et al.

[11] Patent Number: 4,529,846
[45] Date of Patent: Jul. 16, 1985

[54] DYNAMIC TELEPHONE RECEIVER WITH MAGNETIC SHUNT

[75] Inventors: Raymond C. Freeman; Beverley W. Gumb, both of London; Alan C. Busche, Dorchester, all of Canada

[73] Assignee: Northern Telecom Limited, Montreal, Canada

[21] Appl. No.: 643,168

[22] Filed: Aug. 22, 1984

[51] Int. Cl.³ .......................... H04R 9/04; H04R 9/10; H04R 1/02
[52] U.S. Cl. ..................... 179/115.5 R; 179/115.5 SF; 179/179
[58] Field of Search .............. 179/115.5 R, 115.5 VC, 179/115.5 PC, 115.5 SF, 115.5 DV, 146 R, 146 E, 117, 119 R, 179, 180, 182; 381/88

[56] References Cited

U.S. PATENT DOCUMENTS

| | | | |
|---|---|---|---|
| 2,197,329 | 4/1940 | Andrieu | 179/115.5 SF |
| 4,035,591 | 7/1977 | Carbonneau | 179/119 R |
| 4,425,482 | 1/1984 | Bordelon et al. | 179/119 R |
| 4,443,667 | 4/1984 | Hunt | 179/117 |
| 4,447,678 | 5/1984 | Fidi | 179/115.5 PS |

Primary Examiner—Gene Z. Rubinson
Assistant Examiner—Danita R. Byrd
Attorney, Agent, or Firm—Sidney T. Jelly

[57] ABSTRACT

A dynamic telephone receiver which is capable of being used in association with hearing aids, has a flux coil positioned around the pole piece and magnet assembly. To minimize the strong magnetic leakage field radiated from the air gap, which can attract pins, paper clips and other ferrous metals a shunt can be provided at the face of the receiver. However, this also shunts or at least severely attenuates the AC field produced by the flux coil for inductive coupling to hearing aids. The shunt of this invention shunts only the leakage flux from the air gap with minimal effect on the AC field from the flux coil. The shunt is in the form of a cup, with a central aperture in the front face, surrounded by an annular ring which is connected to the outer wall of the cup by narrow arms. The inner circumference of the ring is formed down towards the magnet to form a lip which attracts stray flux from the air gap. The shunt also acts to hold the receiver assembly together.

8 Claims, 5 Drawing Figures

DYNAMIC TELEPHONE RECEIVER WITH MAGNETIC SHUNT

This invention relates to dynamic telephone handset receivers and is particularly concerned with such receivers which include a flux coil for inductive coupling with hearing aids.

One of the problems associated with high efficiency dynamic (moving coil) type receiver units is the strong magnetic leakage field radiated from the air gap at the front of the unit. This field is so strong that it will attract pins and paper clips and other ferrous articles which become attached to the handset. This can be hazardous as well as being a nuisance. The effect can be minimized by shunting the leakage flux across the face of the receiver unit through a shunt made of a soft magnetic material such as a low carbon steel. One typical example is a circular steel disc centered on the front cover of the unit. The diameter of the disc is somewhat greater than the diameter of the air gap. However, this is an extra part which can be eliminated by making a steel front cover of sufficient thickness to shunt the field.

Making a steel front cover, however, is not always possible. For example, in testing for dielectric breakdown, a handset is wrapped in aluminum foil, which is grounded. The path from the voice coil of the receiver unit, through the ear cap holes in the receiver housing of the handset, to the aluminum foil, must be such that there can be applied a high voltage without dielectric breakdown. A steel shunt interposed between the ear cap holes and the voice coil increases the difficulty of meeting the dielectric breakdown requirements.

A further problem is that a full steel front cover shunts and attenuates an AC magnetic field produced by a flux coil provided to radiate an AC magnetic field suitable for the inductive coupling of hearing aids.

The invention provides a magnetic shunt which shunts the leakage flux from the air gap but has minimal effect on the AC magnetic field produced by the flux coil. The shunt is in the form of a cup-shaped ferrule, the front face of which has a central aperture, surrounded by an annular ring which is connected to the outer circumference of the ferrule by a plurality of relatively narrow arms. The inner circumference of the annular ring is formed downwards, towards the magnet to form a lip which attracts stray flux from the air gap into the shunt. The ferrule acts to hold the receiver assembly together.

The invention will be readily understood by the following description of an embodiment, by way of example, in conjunction with the accompanying drawings, in which.

Figure 1:
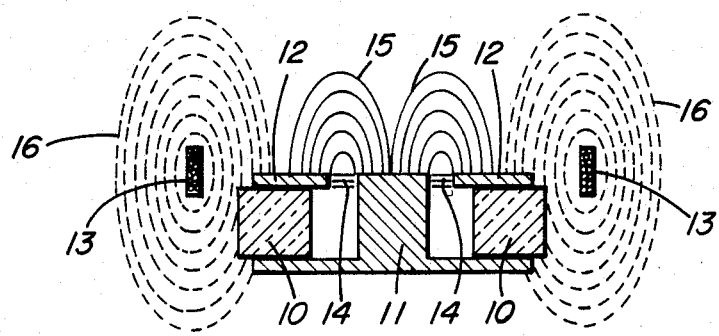
FIG. 1 is a diagrammatic cross-section through a receiver unit, illustrating the leakage flux field radiated from the air gap and the AC magnetic field radiated by the flux coil.

Illustrated in FIG. 1 are the basic magnetic items of a receiver unit, the ceramic permanent magnet 10, which is annular in form, the pole pieces 11 and 12, and the flux coil 13. An annular air gap 14 exists between the center pole piece 11 and the annular pole piece 12. Also indicated is the permanent magnet flux at 15 and the flux coil magnetic field at 16. The magnetic flux 15 creates the problem of ferrous articles being picked up by and adhering to the ear piece of the handset.

Figure 2:
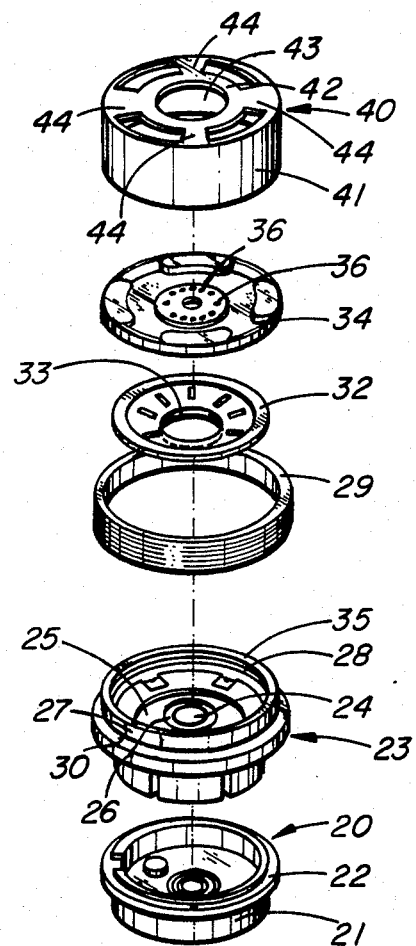
FIG. 2 is an exploded perspective view of a receiver unit with a shunt ferrule in accordance with the present invention.

FIG. 2 illustrates the various parts of a receiver unit. At 20 is illustrated the back cover, of a plastic material, being of cup-shaped form with a peripheral wall 21 at the upper edge of which is an outwardly extending peripheral rib 22. The pole piece and magnet assembly is indicated at 23, with the center pole at 24, an annular pole at 25 and the air gap at 26. A peripheral wall 27 extends upward from the main body portion of the assembly, the wall 27 having a narrow ledge 28 extending around the inside part way up the inner surface of the wall. A flux coil 29 fits over the wall 27, resting on a ledge 30 on the assembly 23.

The diaphragm 32, with the voice coil 33, rests on the ledge 28 and held in position, for example by an adhesive. Front cover 34 rests on the top edge 35 of the wall 27. The front cover is recessed around the periphery of its lower surface so as to locate on the wall 27, but is clear of the diaphragm and voice coil assembly. The front cover 34 has apertures 36 therein for passage of sound. The diaphragm and front cover, in the present example, are of plastic material.

Figure 3:
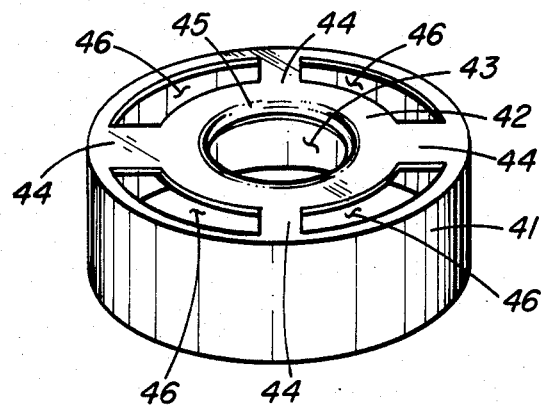
FIG. 3 is an enlarged perspective view of the shunt ferrule of FIG. 2.

At 40 is illustrated the steel ferrule/shunt. The ferrule comprises a generally cup-shaped form having a front face and a wall 41 extending in an axial direction from the front wall. The front face is composed of an annular ring portion 42, with a central aperture 43, joined to the wall 41 by a plurality of narrow arms 44, in the present example four arms. The ferrule is seen in more detail in FIG. 3. The periphery 45 of the aperture 43 is formed to extend downward in the form of a lip. This attracts stray flux from the air gap. The inside diameter of the annular ring portion is slightly larger than the outer diameter of the air gap 26 (FIG. 2), the annular ring being substantially axially aligned with the annular pole piece 25. The arms 44 define, with the annular ring portion 42 and the wall 41, large openings 46. The outer edges of the openings 46 are approximately aligned with the outer diameter of the flux coil.

Figure 4:
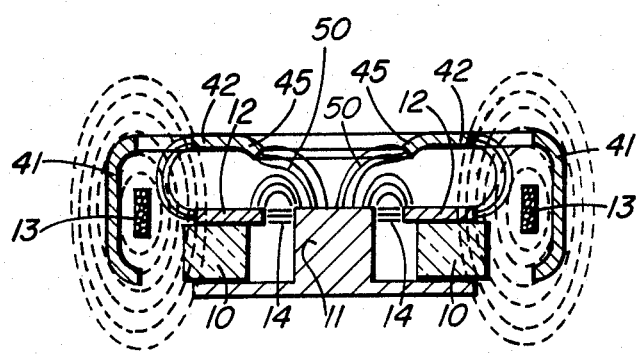
FIG. 4 is a diagrammatic cross-section, similar to that of FIG. 1, illustrating the shunting of the leakage flux.

FIG. 4 illustrates the effect of the ferrule/shunt 41 on the aagnetic fields, as compared with FIG. 1. The annular ring portion 42 shunts the magnetic flux of the permanent magnet, as illustrated at 50. The outside wall 41 and the large openings 46 allow passage of the flux coil magnetic field 16 with only minimal shunting and attenuation.

Figure 5:
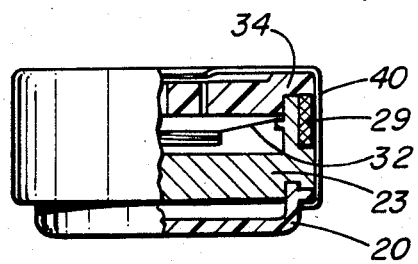
FIG. 5 is a side view of an assembled receiver unit, partly in section.

The receiver unit, as illustrated in FIG. 2, is assembled as a unit, as illustrated in FIG. 5. The pole piece and magnet assembly 23 rest in the back cover 20, the diaphragm 32 resting on the ledge 28 and the front cover 34 positioned on top of the assembly 23, resting on the top edge 35. The ferrule 40 is slid down over the front cover and the pole piece and magnet assembly 23 and the lower edge of the wall 41 is crimped or swaged over behind the annular peripherally extending rib 22 on the back cover.

The width of the arms 44, the diameter of the central aperture 43 and the outer diameter of the annular ring 42 can vary. In a particular example, the diameter of the center aperture is approximately 18 mm, the outside diameter of the annular ring portion 42 approximately 29 mm, and a typical value for the widths of the arms 44 being about 6 mm, although some variation in these dimensions can be provided depending upon results required. The shunt member is conveniently of steel, although it is possible to have the front face only of steel and the wall 41 of, for example, aluminum.

What is claimed is:

1. A dynamic telephone receiver, capable of use with hearing aids, including a cup-shaped back cover, a pole piece and magnet assembly positioned in and extending axially from the back cover, the pole piece and magnet assembly including a peripheral wall extending axially in a direction away from the back cover, a flux coil positioned around the outside of the peripheral wall, a diaphragm and voice coil assembly positioned within the peripheral wall and supported thereby, a front cover resting on the forward end surface of the peripheral wall, and a cup-shaped magnetic shunt member having an end surface extending over said front cover and also having a peripheral wall extending axially over the front cover, and the flux coil, and being swaged over behind an annular rib on the periphery of the back cover, the end surface of the shunt having a central aperture surrounded by an annular portion, and a plurality of narrow radial arms extending from the annular portion to the peripheral wall of the shunt to define a plurality of arcuate apertures extending in an annular formation.

2. A receiver as claimed in claim 1, said pole piece and magnet assembly comprising a central cylindrical pole piece, an annular pole piece surrounding the central pole piece with an air gap between said pole pieces, the central aperture of the end surface of the shunt being of a diameter greater than the outer diameter of the air gap.

3. A receiver as claimed in claim 2, the inner edge of the annular portion of the end surface of the shunt being formed downward towards the annular pole piece.

4. A receiver as claimed in claim 2, the outer edge of the annular portion substantially in axial alignment with the outer circumference of the annular pole piece.

5. A receiver as claimed in claim 1, the outer edges of said apertures substantially in axial alignment with the outer circumference of the flux coil.

6. A receiver as claimed in claim 1, the diameter of said central aperture being about 18 mm.

7. A receiver as claimed in claim 1 said annular portion having an internal diameter of about 18 mm and an external diameter of about 29 mm.

8. A receiver as claimed in claim 1 said radial arms being about 6 mm wide.

* * * * *